April 7, 1964  W. FOURNIER ETAL  3,128,120
CLOSURE STRUCTURE FOR FLOATABLE TRUCK BODY
Filed Oct. 24, 1961  2 Sheets-Sheet 1

INVENTORS
William Fournier &
BY John V. Peeples

Paul J. Rising
ATTORNEY

April 7, 1964   W. FOURNIER ETAL   3,128,120
CLOSURE STRUCTURE FOR FLOATABLE TRUCK BODY
Filed Oct. 24, 1961   2 Sheets-Sheet 2

INVENTORS
William Fournier &
BY John V. Peeples
Paul J. Reising
ATTORNEY

United States Patent Office 3,128,120
Patented Apr. 7, 1964

---

3,128,120
CLOSURE STRUCTURE FOR FLOATABLE TRUCK BODY
William Fournier and John V. Peeples, Pontiac, Mich., assignors to General Motors Corporation, Detroit, Mich., a corporation of Delaware
Filed Oct. 24, 1961, Ser. No. 147,289
7 Claims. (Cl. 296—57)

This invention relates to a closure for vehicle bodies and more particularly to a closure and latch arrangement particularly useful for the tailgate or sidegate structure of amphibious type trucks such as are used in military operations.

Amphibious supply vehicles or trucks are, like most other types of trucks, generally required to have a drop gate in the rear or side of the vehicle body so as to facilitate the egress and ingress of cargo. The provision of such a gate gives rise to a sealing problem since, when closed, it must be completely water tight. It has heretofore been the practice to swingably mount the gate to the vehicle body by metallic hinge members and fix strips of sealing material either to the gate or body at the mating joints in order to provide the necessary watertight seal. However, this arrangement has various drawbacks perhaps the chief of which is that it lacks the requisite durability to maintain a good watertight seal after repeated use. Generally what occurs is that during the course of cargo loadings and unloadings the hinges become bent thereby causing a misalignment of the closure member with the body and a resultant defective seal. Another problem has been that of corrosion of the metallic hinge members which is greatly accelerated by reason of the heavy concentration of salt found in sea waters where amphibious vehicles are generally required to operate.

It is an object of this invention to provide a watertight closure for amphibious vehicles that has greatly increased durability and resistance to damage to tis sealing characteristics by corrosion or by the jars and blows attendant to normal vehicle loading and unloading operations.

A further object of this invention is to provide a watertight closure for amphibious vehicles that includes a latch arrangement which cooperates with aligning surfaces formed on the vehicle body and closure for insuring that the closure is sealingly locked to the vehicle body.

Broadly stated, the above is accomplished by providing a strip of resilient material for hingedly mounting a closure to a vehicle body and, in addition for serving as a seal between the two. Additional sealing strips are disposed adjacent the hinge strip and together with the latter provide a watertight seal when the closure is in the closed positon. A latch arrangement is associated with the closure and cooperates with aligning means in the form of a raised surface and a complementary surface formed on the body and closure, respectively, for repeatedly locking the closure to the body in the same position so as to realize a watertight seal.

A fuller understanding of the present invention will be derived from the following description taken in conjunction wth the drawings in which.

Figure 1:
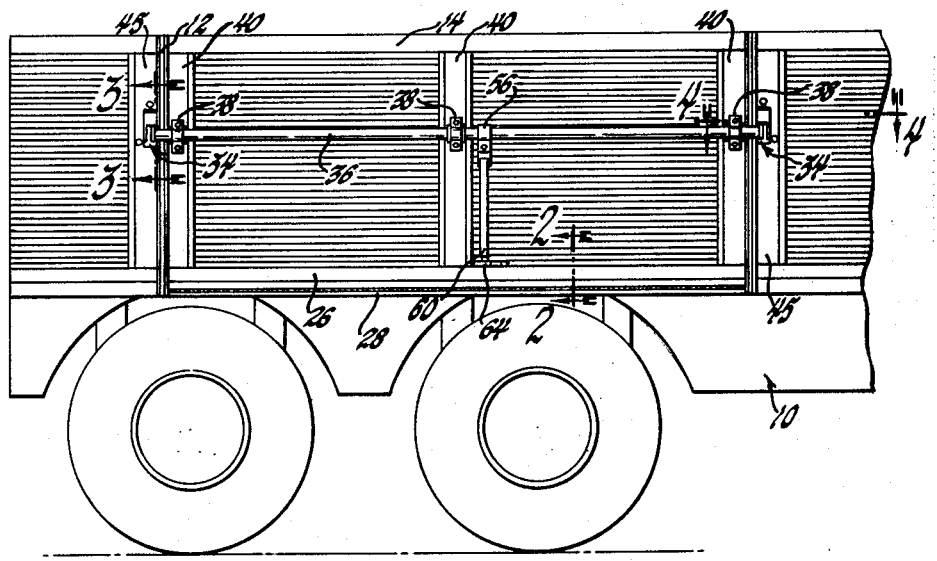
FIGURE 1 is an elevation view of a portion of a vehicle body incorporating the subject invention.
Figure 2:
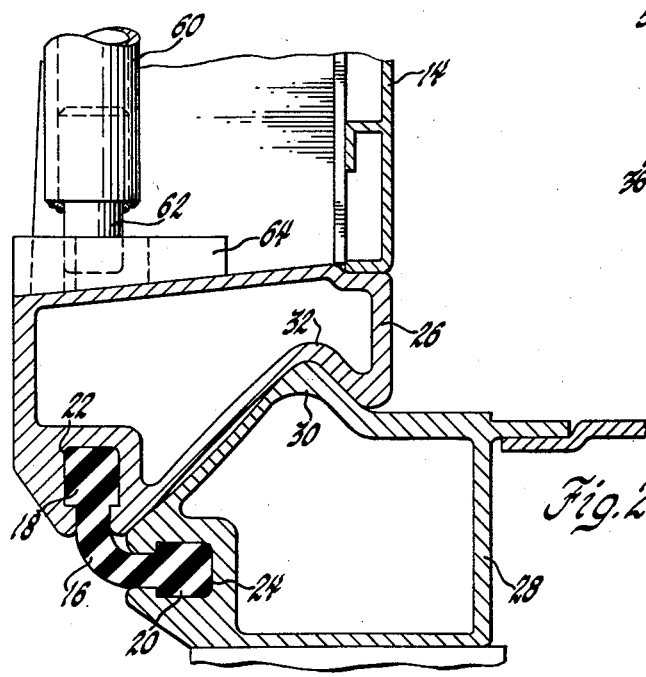
FIGURE 2 is an enlarged sectional view taken on lines 2—2 of FIGURE 1.
Figure 5:
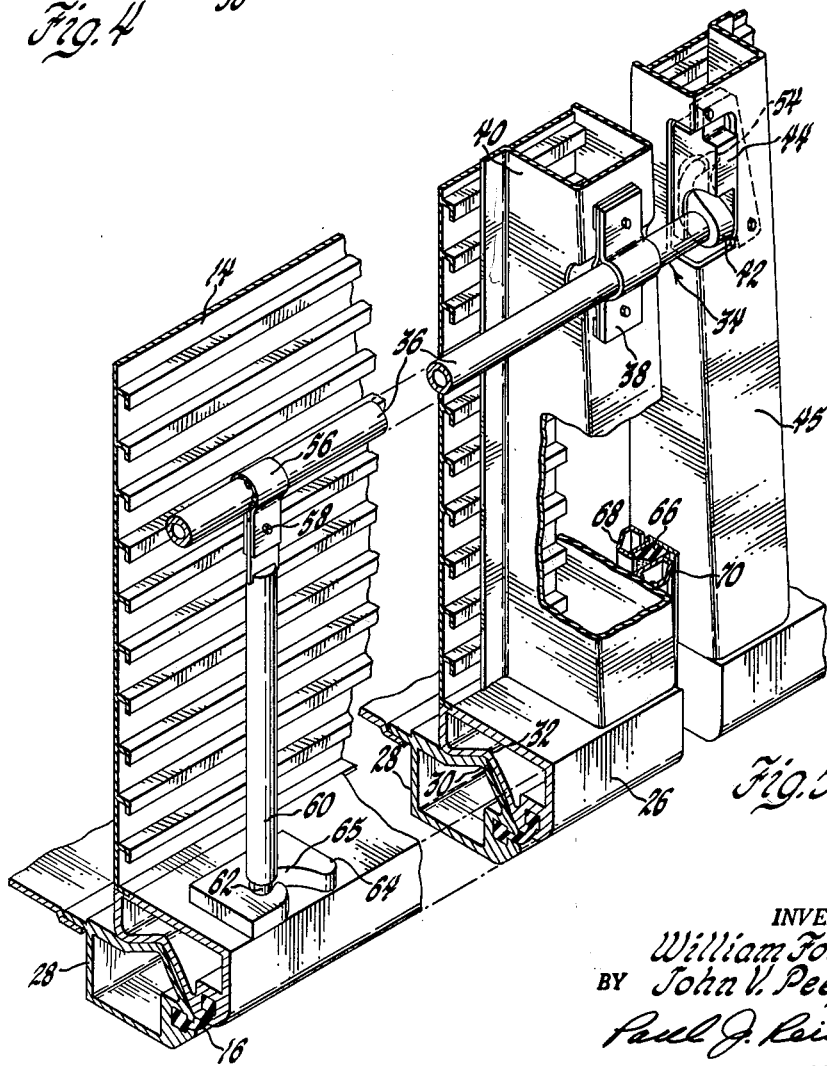
FIGURE 5 is a perspective view with parts broken away and illustrates the subject invention incorporated with a closure and vehicle body.

Referring now to FIGURE 1, a vehicle body is indicated generally by the numeral 10 and includes a rectangular opening 12 formed in the side of the body that is adapted to be closed by a closure or drop gate 14. As best seen in FIGURE 2, the closure 14 is permanently connected to the body by a resilient strip 16 made from elastomeric material which extends the full length of the closure 14 and includes a pair of enlarged heads 18 and 20 that are suitably mounted in elongated channels 22 and 24, respectively, formed in the extrusions 26 and 28. The respective extrusions are made from a non-corroding metal such as aluminum, and are connected to the closure and the vehicle body 10 adjacent the hinge axis. The extrusion 28 includes a V-shaped raised portion 30 that is complementary to and adapted to mate with an inverted V portion 32 formed in the extrusion 26. As best seen in FIGURE 5, the raised portion 30 and complementary portion 32 are formed the full longitudinal extent of the extrusions and provide abutting surfaces for maintaining the closure 14 in vertical alignment wth the body 10.

Figure 3:
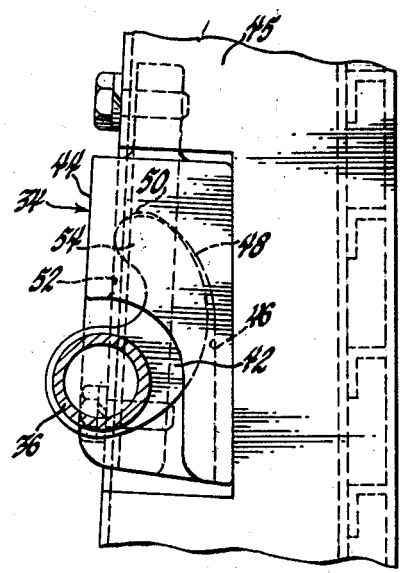
FIGURE 3 is an enlarged sectional view taken on lines 3—3 of FIGURE 1.

As best viewed in FIGURES 1 and 5, the closure 14 includes a latch mechanism, generally indicated by the numeral 34, comprising an elongated shaft 36 that is rotatably mounted to the closure by a plurality of brackets 38 each of which is fixed to the outer surface of a U-shaped support member 40. Each end of the shaft 36 has a fishtail bolt 42 mounted thereto that is receivable by a keeper 44 suitably fastened to each of the upright support members 45 that border the closure 14 at the sides thereof. The bolt and keeper structures at each end of the shaft 36 are identical, tand therefore, hereinafter like reference numerals will be used to denote like parts in each structure. The keeper includes a pocket portion 46 which is defined by curved walls 48 and 50 that connect with a straight wall 52, and serves as a receiving well for the fishtail bolt 42. As best viewed in FIGURES 3 and 5, when the bolt is located in the keeper, an end portion 54 of the bolt is cammed into contact with the curved surface 50 of the keeper wth the result that a force component acts on the closure in a downward direction towards the complementary surfaces formed in the extrusions.

A clamp 56 is rigidly secured to the shaft 36 by conventional means, such as welding, and includes a pin 58 for pivotally supporting one end of a rod-type handle 60. The handle 60 terminates at the free end thereof with a stud 62 of a reduced diameter that is press fitted into a bore formed in the handle and suitably secured therein by a weld. A handle retaining means 64 is secured to the extrusion 26 below the clamp 56 and includes a curved slot 65 for receiving the stud 62 for locking the latch arrangement 34.

Figure 4:
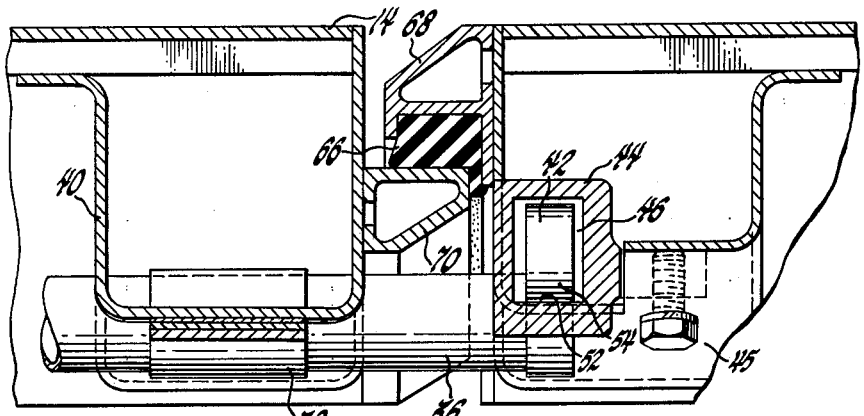
FIGURE 4 is an enlarged sectional view taken on lines 4—4 of FIGURE 1.

As best viewed in FIGURES 4 and 5, a strip 66 of sealing material such as rubber is mounted within a suitable opening formed in a member 68 that extends the full vertical length of the support 45 and is fastened thereto. A seal abutting member 70 extends along the side portion of the closure and serves to effectively seal the closure to the body along the side of the closure opening when the closure is raised to the closed position. A sealing arrangement similar to the above is incorporated along the other side of the closure and the two arrangements together with the resilient hinge 16 effectively seal the interior of the body from any water.

The operation of my invention is as follows: To open the drop gate, the handle 60 is pivoted out of the curved slot 65 of the handle retaining member 64, by a slight lateral movement followed by an upward movement of the handle. Such movement causes the shaft 36 to rotate about its longitudinal axis causing a corresponding rotary movement of the fishtail bolt 42. Rotation of the fishtail bolts 42 causes the curved surfaces thereof to engage the keeper curved wall 48 resulting in an outward urging of the latch mechanism and the associated closure. This forceful urging results in the inverted V 32 of the extrusion 26 overriding the raised portion 30 of the extrusion 28, whereupon, the closure is freely lowered to a fully open position disposing it in a vertical plane adjacent the vehicle body. The resilient hinge 16 is of sufficient strength to support the closure in its freely lowered position and, in addition, is capable of absorbing any forceful blows normally encountered by the closure. It can be seen that during the raising movement of the closure, the forward portion of the extrusion 26 is obstructed by the raised portion 30 of the extrusion 28; however, this presents no problem since the resiliency of the hinge 16 permits the extrusion 26 to override and seat in the position shown in FIGURE 2. When the closure is fully raised, the fishtail bolts of the latching arrangement are cammed into their respective keepers 44 with subsequent positioning of the handle stud 62 in the handle retaining slot 65.

As alluded to above, the raised portion 30 and the complementary surface 26 coact so as to provide a guide means for positioning the closure in a vertical plane. It is extremely important that the closure be repeatedly positioned in the same vertical plane so as to assure effective sealing between the members 68 and 70. Moreover, due to the camming action of the bolts and the engagement of the end portion 54 which the surface 62 of the keeper, the closure is forcibly moved in a downward position so as to provide a firm seating engagement of the surfaces 30 and 32. It can be seen that with this arrangement any forceful blows absorbed by the closure when in an open position are ineffective to change the relationship of the closure with respect to the vehicle body while in its closed position. In addition, the cooperation of the latching mechanism with the surfaces 30 and 32 provides a rigid closure mounting which precludes movement of the drop gate in a horizontal and vertical direction and thereby provides an effective seal between the closure and body.

It is to be understood that the device as described and shown herein is for the purpose of illustration, and that various changes and modifications may be made without departing from the spirit and scope of the invention as set forth in the appended claims.

What is claimed is:

1. In a vehicle body including a closure member mounted for movement between open and closed positions about a hinge axis, the combination of a resilient hinge mounting said closure to said body, sealing means interposed between the body and said closure for providing a liquid tight seal when the closure is in the closed position, latch means associated with the closure member for locking said closure member to said body, a raised surface formed on the body adjacent the hinge axis, a complementary surface formed on the closure member adjacent the hinge axis and mating with said raised surface when the closure member is in a closed position, cooperating engageable portions formed with the latch means, said engageable portions being so located so as to cause said complementary surface of the closure to be urged towards the raised surface when the latch means are locked to ensure proper mating of the surfaces so as to align said closure member with respect to said body and prevent unsealing movement of the closure member.

2. In a vehicle body including a closure member mounted for movement between open and closed positions about a hinge axis, the combination of a resilient hinge mounting said closure to said body, sealing means interposed between the body and said closure for providing a liquid tight seal when the closure is in the closed position, latch means associated with the closure member for locking said closure member to said body, said latch means having a shaft mounted on said closure member for pivotal movement about its axis, bolt means fixed to said shaft, keeper means carried by said body, means for pivoting said shaft about its axis when the closure member is in the closed position whereby said bolt means moves into said keeper means, means for locking said last-mentioned means, a raised surface formed on the body adjacent the hinge axis, a complementary surface formed on the closure member adjacent the hinge axis and mating with said raised surface when the closure member is in a closed position, cooperating engageable portions formed with the bolt and keeper means, said engageable portions being so located so as to cause said complementary surface of the closure to be urged towards the raised surface when the latch means are locked to ensure proper mating of the surfaces so as to align said closure member with respect to said body and prevent unsealing movement of the closure member.

3. In a vehicle body including a closure member mounted for movement between open and closed positions about a hinge axis, the combination of a resilient hinge mounting said closure to said body, sealing means interposed between the body and said closure for providing a liquid tight seal when the closure is in the closed position, latch means associated with the closure member for locking said closure member to said body, a V-shaped raised surface formed on the body adjacent the hinge axis, a complementary surface formed on the closure member adjacent the hinge axis and mating with said raised surface when the closure member is in a closed position, cooperating engageable portions formed with the latch means, said engageable portions being so located so as to cause said complementary surface of the closure to be urged towards the raised surface when the latch means are locked to ensure proper mating of the surfaces so as to align said closure member with respect to said body and prevent unsealing movement of the closure member.

4. In a vehicle body including a closure member mounted for movement between open and closed positions about a hinge axis, the combination of a resilient hinge mounting said closure to said body, sealing means interposed between the body and said closure for providing a liquid tight seal when the closure is in the closed position, latch means associated with the closure member for locking said closure member to said body, said latch means comprising rotary bolt means and keeper means, means for maintaining said bolt means in said keeper means when said closure member is in the closed position, a raised surface formed on the body adjacent the hinge axis, a complementary surface formed on the closure member adjacent the hinge axis and mating with said raised surface when the closure member is in a closed position, cooperating engageable portions formed with the bolt and keeper means, said engageable portions being so located so as to cause said complementary surface of the closure to be urged towards the raised surface when the latch means are locked to ensure proper mating of the surfaces so as to align said closure member with respect to said body and prevent unsealing movement of the closure member.

5. In a vehicle body including a closure member mounted for movement between open and closed positions about a hinge axis, the combination of a resilient hinge mounting said closure to said body, sealing means interposed between the body and said closure for providing a liquid tight seal when the closure is in the closed position, latch means associated with the closure member for locking said closure member to said body, said latch means comprising rotary bolt means and keeper means, means for maintaining said bolt means in said keeper means when said closure member is in the closed position, a V-shaped surface formed on the body adjacent the hinge axis, a complementary surface formed on the closure member adjacent the hinge axis and mating with said raised surface when the closure member is in a closed position, cooperating engageable portions formed with the bolt and keeper means, said engageable portions being so located so as to cause said complementary surface of the closure to be urged towards the V-shaped surface when the latch means are locked to ensure proper mating of the surfaces so as to align said closure member with respect to said body and prevent unsealing movement of the closure member.

6. In a vehicle body including a closure member mounted for movement between open and closed positions about a hinge axis, the combination of a resilient hinge mounting said closure to said body, sealing means interposed between the body and said closure for providing a liquid tight seal when the closure is in the closed position, latch means associated with the closure member for locking said closure member to said body, said latch means having a shaft mounted on said closure member for pivotal movement about its axis, bolt means fixed to said shaft, keeper means carried by said body, means for pivoting said shaft about its axis when the closure member is in the closed position whereby said bolt means moves into said keeper means, means for locking said last-mentioned means, a V-shaped raised surface formed on the body adjacent the hinge axis, a complementary surface formed on the closure member adjacent the hinge axis and mating with said V-shaped raised surface when the closure member is in a closed position, cooperating engageable portions formed with the bolt and keeper means, said engageable portions being so located so as to cause said complementary surface of the closure to be urged towards the raised surface when the latch means are locked to ensure proper mating of the surfaces so as to align said closure member with respect to said body and prevent unsealing movement of the closure member.

7. In a vehicle body including a closure member mounted for movement between open and closed positions about a hinge axis, the combination of a resilient hinge mounting said closure to said body, sealing means interposed between the body and said closure for providing a liquid tight seal when the closure is in the closed position, latch means associated with the closure member for locking said closure member to said body, said latch means having a shaft mounted on said closure member for pivotal movement about its longitudinal axis, a fishtail bolt fixed to one end of said shaft and having a camming portion, keeper means carried by the body, a handle pivotally attached to the shaft and adapted to rotate the shaft about its axis when the closure member is in the closed position whereby said camming portion of the bolt coacts with said keeper to urge the closure member towards the hinge axis, a handle retaining means having a curved slot therein for locking said latch, a V-shaped raised surface formed on the body adjacent the hinge axis, a complementary surface formed on the closure member adjacent the hinge axis and mating with said V-shaped raised surface when the closure member is in a closed position, said coaction between the camming portion and the keeper means causing the complementary surface of the closure to be pressed into engagement with the raised surface so as to align said closure member with respect to said body and prevent unsealing movement of the closure member.

References Cited in the file of this patent

UNITED STATES PATENTS

| | | |
|---|---|---|
| 1,041,794 | Holtfrerich | Oct. 22, 1912 |
| 1,551,506 | Parsons | Aug. 25, 1925 |
| 2,226,615 | Killen | Dec. 31, 1940 |
| 2,507,965 | Eichner | May 16, 1950 |